(12) United States Patent
Rubio (10) Patent No.: US 8,787,681 B1
(45) Date of Patent: Jul. 22, 2014

(54) SYSTEM AND METHOD FOR CLASSIFYING DOCUMENTS

(75) Inventor: Christopher Lawrence Rubio, Oceanside, CA (US)

(73) Assignee: First American Data Tree LLC, Santa Ana, CA (US)

(*) Notice: Subject to any disclaimer, the term of this patent is extended or adjusted under 35 U.S.C. 154(b) by 348 days.

(21) Appl. No.: 13/053,033

(22) Filed: Mar. 21, 2011

(51) Int. Cl.
*G06K 9/22* (2006.01)

(52) U.S. Cl.
USPC ............ 382/224; 382/225; 382/228; 382/229

(58) Field of Classification Search
None
See application file for complete search history.

(56) References Cited

U.S. PATENT DOCUMENTS

| | | | |
|---|---|---|---|
| 7,870,039 B1* | 1/2011 | Dom et al. | 705/26.41 |
| 2003/0177118 A1* | 9/2003 | Moon et al. | 707/5 |
| 2005/0065776 A1* | 3/2005 | Coden et al. | 704/10 |
| 2005/0203898 A1* | 9/2005 | Boyer et al. | 707/4 |
| 2006/0206584 A1* | 9/2006 | Hyder et al. | 709/218 |

FOREIGN PATENT DOCUMENTS

WO       WO 0114992 A1 *   3/2001

* cited by examiner

*Primary Examiner* — Jason M Repko
*Assistant Examiner* — Jhere Rowland
(74) *Attorney, Agent, or Firm* — Sheppard Mullin Richter & Hampton LLP (57) ABSTRACT

Various embodiments of the invention provide systems and methods for classifying physical documents that have been converted to digital documents. Specifically, some embodiments are configured to classify digital documents that belong to a document classification whose representative members that lack structure or have varying structure, either of which makes automatic classification of such documents using conventional methods difficult. For example, certain systems and methods according to the invention can be used to classify physical real estate documents that have been converted to digital real estate documents, especially those that lack a discernable document structure.

27 Claims, 7 Drawing Sheets

FIG. 1
(CONVENTIONAL)

SYSTEM AND METHOD FOR CLASSIFYING DOCUMENTS

FIELD OF THE INVENTION

The present invention relates to document processing, and more particularly, some embodiments relate to classifying digital documents.

DESCRIPTION OF THE RELATED ART

For some time now, computers have had the ability to convert and store physical documents into digital documents. Generally, the conversion involves using a document scanner attached to a computer to scan the physical document and convert the resulting digital representation to a computer image file, such as, for example, a bitmap image (BMP) file, a Tagged Image File Format (TIFF) file, or a Joint Photographic Experts Group (JPEG) file. Following the scan, the image file of the document may be post-processed using optical character recognition (OCR) software, which locates characters within the image of the document (whether they be handwritten, typewritten, or printed) and translates them to computer-readable text. Subsequently, the resulting computer-readable text is typically saved to a computer document file, such as a text file, Portable Document File (PDF) or a Microsoft® Word document, from which the characters of the document can be readily recognized or modified using a computer.

With the world becoming increasingly digital, the desire to convert physical records to digital form accessible by computers has become commonplace. This is especially true in industries such as health care and real estate, where heavy reliance is placed on computer technologies such as document scanners and OCR software to convert the physical records into digital records. For example, in the real estate industry, both business and government entities are currently involved in converting physical real estate documents stored at public records offices to digital documents. Once converted, these digital documents, which may or may not be post-processed using OCR software, are categorized by business entities to make them easier to locate and review during real estate transactions (e.g., when generating a real estate title report).

Figure 1:
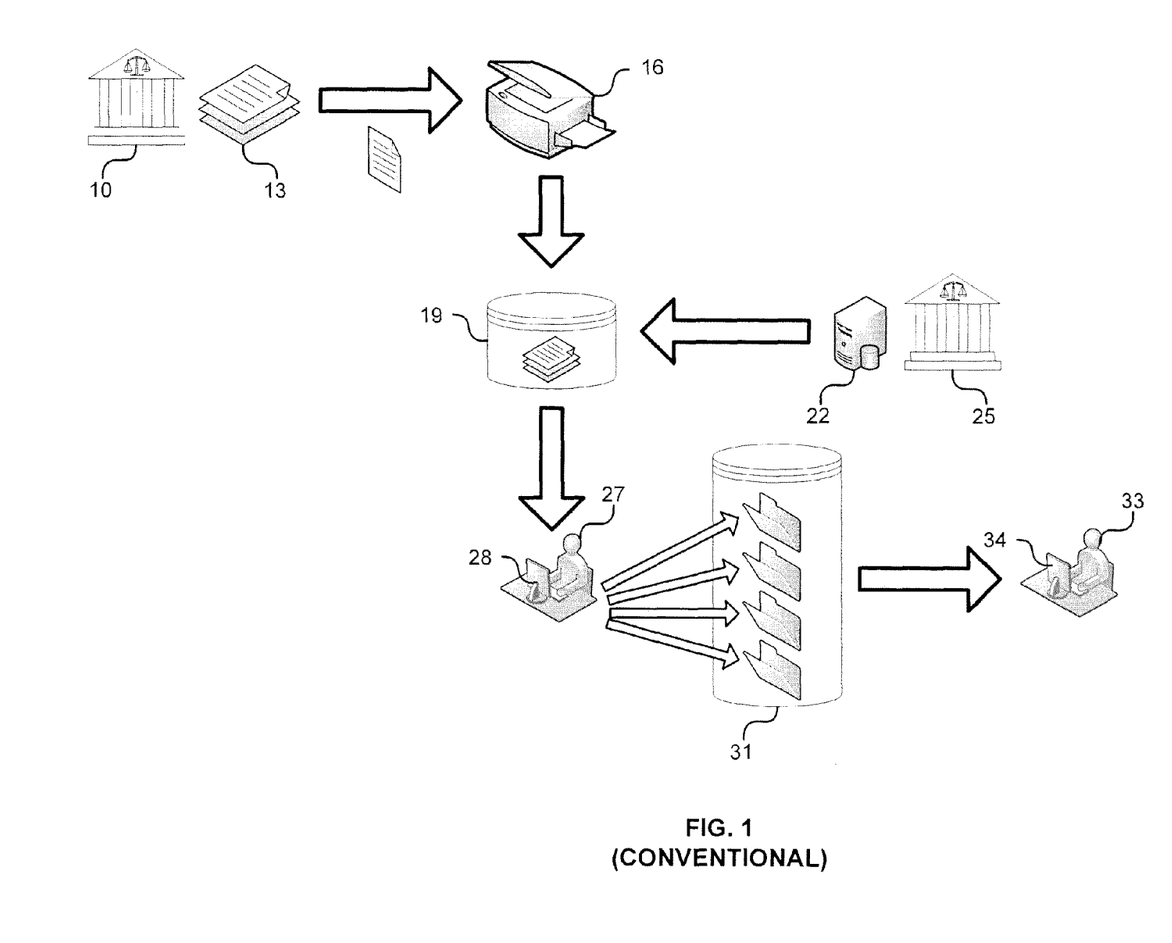
FIG. 1 is a flowchart illustrating a conventional method for classifying real-estate-related public documents.

FIG. 1 illustrates a diagram illustrating one conventional method by which business entities classify real estate-related digital documents. As illustrated by the diagram, public documents at public records offices (10, 25) are either stored as physical documents 13 (e.g., micro fiche) or as digital documents on a server 22. Presently, some real estate companies (e.g., title insurance companies) are aggregating real estate-related public documents from these sources (13 via 16, 22) and storing them on their own private database 19 for use during real estate transactions. Where the public documents are already stored at the public records offices as digital documents (e.g., 25), companies simply gain access to public records office's server 22 (i.e., via a feed) and electronically collect data via that access. However, where the public documents are only available in physical form, companies must first obtain the physical documents 13 from the public records office 10 and then convert them to digital documents using, for example, a document scanner 16. To make the digital documents retrieved from sources 13 or 22 computer searchable, the digital documents are usually processed using OCR software to translate the text image into computer readable text. Additionally, because digital and physical documents from the public records offices are usually uncategorized when they are retrieved, both digital and physical documents are typically categorized by a human analyst to increase their computer-searchability. Some example real estate document classification include deeds of trusts, mechanics liens, and assignments of rights.

Though existing OCR technologies can perform limited levels of categorization of digital documents, they usually rely on a standardized document structure. Real estate documents usually have a document structure that varies jurisdiction-to-jurisdiction (e.g., country-to-country, state-to-state, county-to-county), or lack document structure altogether (e.g., handwritten real estate document). Consequently, it is has been difficult for computers to automatically ascertain via OCR or some other image classification alone what document classification certain real estate documents belong to. Companies therefore resort to conventional methods of document classification that involve a large number of human analysts 27 reviewing the digital real estate documents on a computer 28 and electronically designating what document classifications 31 the digital real estate document belongs to. Eventually, a user 33 (e.g., title analyst) interested in accessing or searching the categorized digital real estate documents can access them through a computer 34.

BRIEF SUMMARY OF EMBODIMENTS OF THE INVENTION

Various embodiments of the invention provide systems and methods for classifying documents, including physical documents that have been converted to digital documents. Specifically, some embodiments are configured to classify digital documents that lack sufficient structure to determine what document classification they belong to, thereby making automatic classification of such documents using conventional computer systems and methods difficult. For example, certain systems and methods according to the invention can be used to automatically classify physical real estate documents that have been converted to digital form, but may lack a discernable document structure.

According to an embodiment of the invention, a method for determining a document classification for a digital real estate document is provided, the method comprising: partitioning the digital real estate document into a set of token patterns; normalizing the set of token patterns to obtain a set of normalized set of token patterns; applying a first filter to the normalized set of token patterns to obtain a first score (e.g., probability) for the digital real estate document, wherein the first filter may be from a plurality of document classification filters and wherein the first score indicates a first likelihood that the digital real estate document is a member of a first document classification associated with the first filter; applying a second filter to the normalized set of token patterns to obtain a second score for the digital real estate document, wherein the second may be from the plurality of document classification filters and wherein the second score indicates a second likelihood that the digital real estate document is a member of a second document classification associated with the second filter; and determining the document classification based on a set of scores associated with the digital real estate document, wherein the set of scores includes the first score and the second score.

According to some embodiments, the first filter comprises a set of indicative token patterns and a set of non-indicative token patterns, where the indicative token patterns are those associated with the first document classification, where the non-indicative token patterns are those not associated with the first document classification, and where applying the first filter to the normalized set of token patterns to obtain the first score comprises determining the first score based on the set of indicative token patterns, the set of non-indicative token patterns, and the normalized set of token patterns.

For example, in some embodiments, determining the first score comprises using a Bayesian-based classification algorithm to determine a probability that the digital real estate document is of the first document classification, wherein the probability is the first score and the probability is calculated using the set of indicative token patterns, the set of non-indicative token patterns, and the normalized set of token patterns. For example, the set of indicative token patterns and the set of non-indicative token patterns can be compared against the normalized set of token patterns from the document.

In some embodiments, determining the document classification based on the set of scores associated with the digital real estate document may comprise: identifying a high score within the set of scores; and determining that the score meets the threshold for the associated document classification. Additionally, determining the document classification based on the set of scores associated with the digital real estate document may comprise determining that the document classification is more than one document classification.

With respect to normalizing, in some embodiments, the operation of normalizing may comprise: locating a candidate token pattern within the set of token patterns; and replacing the candidate token pattern with a normalized token marker. For example, the candidate token pattern may be a date, a monetary value, or a number that is replaced by a normalize token marker. In other embodiments, the operation of normalizing may comprise locating and removing a candidate token pattern within the set of token patterns, wherein the candidate token pattern is a commonly occurring word. For example, the commonly occurring word may be a conjunction, a linking verb, a preposition, or an article that is removed from the set of token patterns. In further embodiments, the operation of normalizing may comprise: locating at least two candidate token patterns within the set of token patterns; and merging the candidate token patterns into a merged token pattern. For example, the token patterns "THERE" and "IS" can be combined to become "THEREIS."

In particular embodiments, the method may further comprise training a filter from a plurality of document classification filters. For example, training may involve receiving a sample digital real estate document of a known document classification; partitioning the sample digital real estate document into a second set of token patterns; informing the filter whether the known document classification matches the filter's associated document classification, thereby resulting in match information; and updating the filter with the second set of token patterns and the match information. In some embodiments, training may further comprise: receiving a test digital real estate document of a known document classification; partitioning the test digital real estate document into a third set of token patterns; applying the filter to the third set of token patterns to obtain a third score for the digital real estate document, wherein the third score indicates a third likelihood that the digital real estate document is a member of the filter's associated document classification; if the known document classification matches the filter's associated document classification but the third score indicates otherwise, updating the filter with the third set of token patterns and an indication of a match (e.g., IS or ISNOT part of the document classification); and if the known document classification does not match the filter's associated document classification but the third score indicates otherwise, updating the filter with the third set of token patterns and an indication of a mismatch. The sample digital real estate document may be from a set of sample digital real estate documents submitted to the filter for training.

In some embodiments, the filter may comprise a set of indicative token patterns and a set of non-indicative token patterns, where the indicative token patterns are those associated with the filter's associated document classification, and where the non-indicative token patterns are those not associated with the filter's associated document classification. In some such embodiments, updating the filter may comprise: updating the set of indicative token patterns when the match information indicates that the known document classification matches the filter's associated document classification; and updating the set of non-indicative token patterns when the match information indicates that the known document classification does not match the filter's associated document classification.

In alternative embodiments, a method for determining a document classification for a digital real estate document is provided, the method comprising: partitioning the digital real estate document into a set of token patterns; normalizing the set of token patterns to obtain a set of normalized set of token patterns; applying a first filter to the normalized set of token patterns to obtain a first indicator of whether the digital real estate document is a member of a first document classification and a first confidence score for the first indicator, wherein the first filter may be from a plurality of document classification filters; applying a second filter to the normalized set of token patterns to obtain a second indicator of whether the digital real estate document is a member of a second document classification and a second confidence score for the second indicator, wherein the second filter may be from the plurality of document classification filters; and determining the document classification from a set of indicators (e.g., indications of IS or ISNOT) associated with the digital real estate document and set of confidence scores associated with the set of indicators (e.g., probability that the indication is correct), wherein the set of indicators includes the first and second indicators and the set of confidence scores includes the first and second confidence scores.

For some embodiments, applying the first filter to the normalized set of token patterns to obtain the first indicator and the first confidence score may comprise: performing a determination of whether the digital real estate document is a member of the first document classification based on the set of indicative token patterns, the set of non-indicative token patterns, and the normalized set of token patterns; setting the first indicator according to the determination; and calculating the first confidence score based on a level of confidence in the determination. Further, in some embodiments, wherein determining the document classification based on the set of indicators and the set of confidence scores may comprise: identifying an indicator in the set of indicators that signifies that the digital real estate document is a member of the indicator's associated document classification; and using the confidence score in the set of confidence scores associated with the indicator to determine whether the document classification is the indicator's associated document classification.

Depending on the embodiment, the confidence score may need to meet a confidence threshold for the document classification to be the indicator's associated document classification (e.g., 90% probability is the threshold).

According to further embodiments, various operations described above are implemented using a computer. For example, some embodiments provide for a computer program product or computer system comprising a computer useable medium having computer program code or instructions embodied therein for controlling a computing system in accordance with aspects of the invention as described herein.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION OF THE EMBODIMENTS OF THE INVENTION

Embodiments of the present invention are directed toward a system and method for classifying digital documents. Various embodiments of the invention provide systems and methods for classifying documents, including physical documents that have been converted to digital documents. Specifically, some embodiments are configured to classify digital documents that belong to a document classification whose representative members lack structure or have varying structure, either of which makes automatic classification of such documents using conventional computer systems and methods difficult. For example, certain systems and methods according to the invention can be used to automatically classify physical real estate documents that have been converted to digital form, but may lack a discernable document structure.

Figure 2:
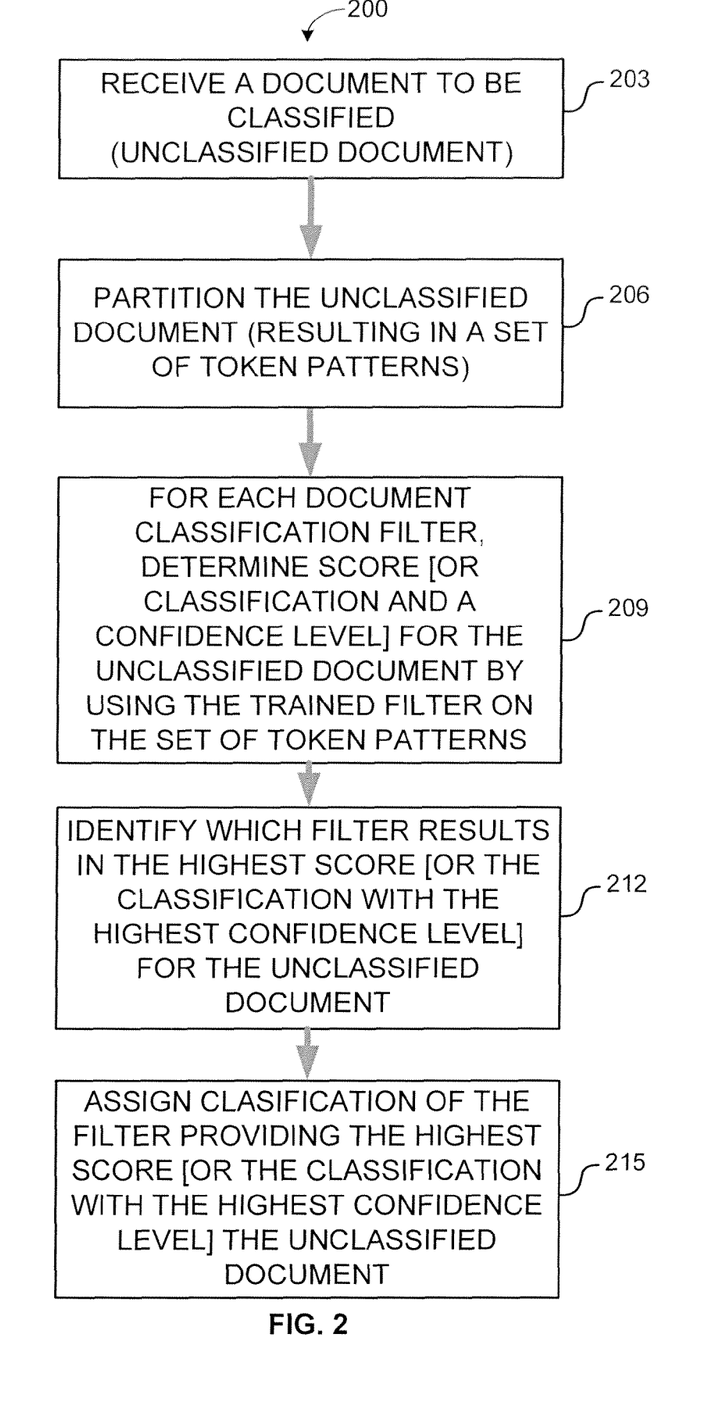
FIG. 2 is a flowchart illustrating an example method for classifying a digital document in accordance with one embodiment of the systems and methods described herein.

FIG. 2 is a flowchart illustrating an example method 200 for classifying a document in accordance with one embodiment of the systems and methods described herein. Method 200 begins at operation 203 where a digital document to be classified (hereafter, referred to as an "unclassified digital document") is received. Depending on the embodiment and the source of the digital document, the digital document received may be in one of a variety computer file formats, including, for example, an image file, a PDF file, or a Microsoft® Word document file. In some embodiments, where the digital document is an image file and the image file has yet to be processed by OCR software, such OCR processing can be implemented to take place before method 200 proceeds to subsequent operations.

Once it is determined that digital document has computer readable text (e.g., via OCR software, or inherently due to the file format), method 200 continues with operation 206, where the unclassified digital document is partitioned into a set of token patterns (also, referred to as "tokenization"). A token may comprise, for example, any word, symbol, character or character string, expression or phrase that is contained within a digital document. For example, a phrase such as "LOT 17 OF TRACT 19778, IN THE CITY OF PASADENA" may be tokenized to "LOT," "17," "OF," "TRACT," "19778," "IN," "THE," "CITY," "OF," and "PASADENA." Other methods of tokenization are also possible, and depend on the configuration of the specific embodiment. More with respect to partitioning a digital document is discussed later with respect FIG. 3, which provides a flowchart illustrating an example method for partitioning digital documents in accordance with one embodiment of the systems and methods described herein.

Continuing with FIG. 2, following the creation of a set of token patterns for the unclassified digital document, method 200 uses a document classification filter (hereafter, also referred to as a "filter") on the unclassified digital document to assess whether the unclassified digital document is a member of the filter's associated document classification. Specifically, operation 209 applies a document classification filter on the set of token patterns associated with the unclassified digital document and either determines: (i) a score for the unclassified digital document, or (ii) a classification assessment and a confidence level for the unclassified digital document (hereafter, also referred to as "classification assessment with confidence level").

In embodiments where a score is provided, the score for the unclassified digital document may indicate the likelihood (e.g., probability) that the unclassified digital document is a member of the filter's associated document classification. Alternatively, in embodiments where a classification assessment and confidence level are provided, the classification assessment may indicate whether the unclassified digital document is a member of the filter's associated document classification and the confidence level indicates the filter's level of confidence in its classification assessment. Additionally, depending on the embodiment, the score or the classification assessment with confidence level may indicate when a filter is unable to provide an assessment. For example, in some embodiments, the filter may indicate its inability to classify an unclassified digital document by providing a negative score, or failing to provide a definitive classification assessment.

The filter may determine the score or the classification assessment with a confidence level using a variety of methodologies. One such methodology is Bayesian-based filters that calculate the probability that a document belongs to a specific document classification based on the document's contents (e.g., set of token patterns) and the filter's training. For example, the filter may utilize naïve Bayesian classification to determine a score or a classification assessment with confidence level for an unclassified digital document. More with respect determining a score and classification assessment with confidence level will be discussed later with FIG. 6, which provides a flowchart illustrating an example method for using a filter to determine a digital document's document classification in accordance an embodiment of the invention.

Figure 3:
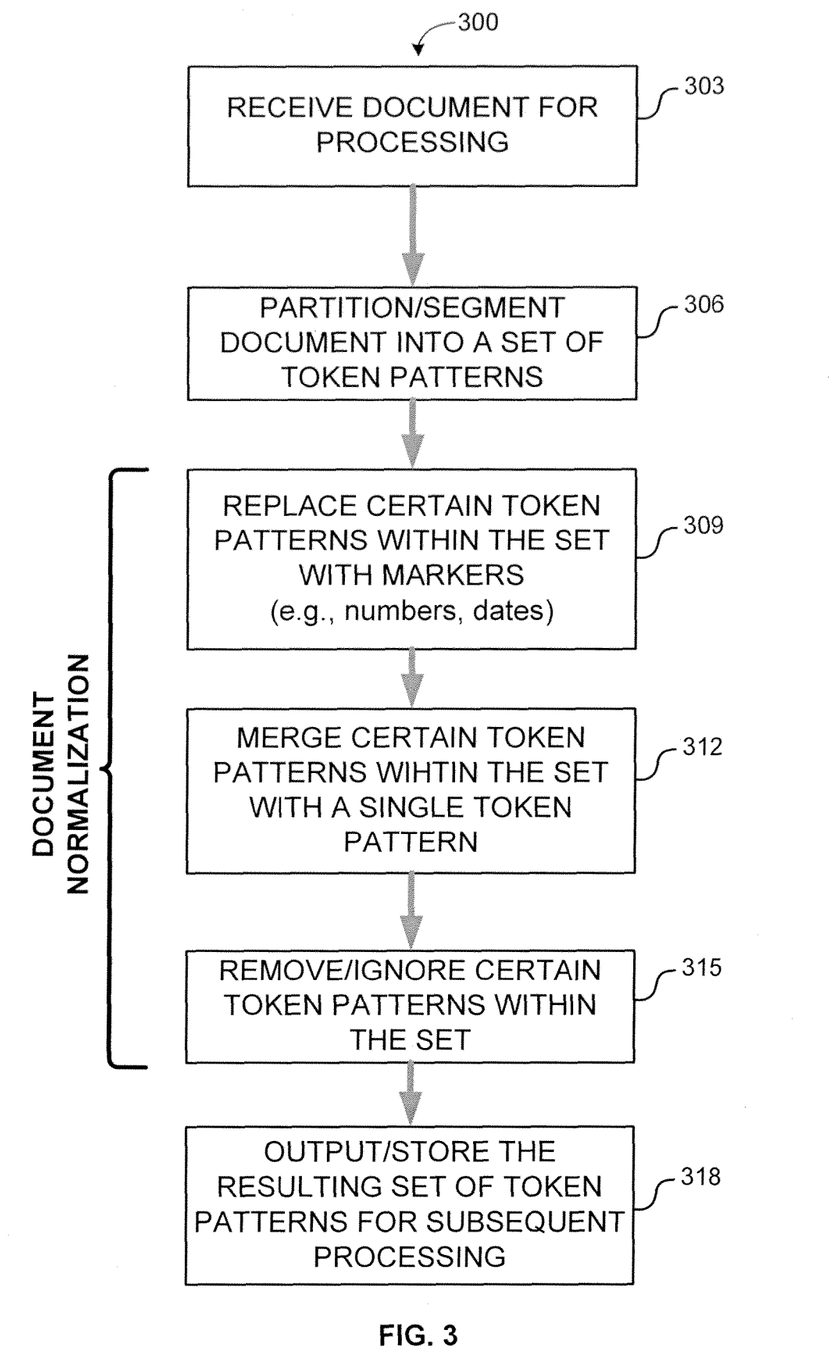
FIG. 3 is a flowchart illustrating an example method for partitioning digital documents in accordance with one embodiment of the systems and methods described herein.

Continuing with FIG. 2, method 200 has a plurality of document classification filters to be applied to the unclassified digital document, with each document classification filter being associated with a given document classification. Accordingly, operation 209 applies one or more filters from the plurality of document classification filters to the set of token patterns and determines a score or a classification assessment and confidence level for each filter applied. Operation 212 then determines which of the document classification filters has the highest score or has a classification assessment with the highest confidence level. Using this determination, operation 215 assigns the unclassified document the document classification associated with the filter having the highest score or the classification assessment having the highest confidence level. Alternatively, in some embodiments, operation 212 may identify a group of document classification filters that meet a threshold score or a threshold confidence level for a classification assessment. Then, in some such embodiments, operation 215 can assign the unclassified document one or more document classifications based on the group of document classification filters that meet a threshold score or a threshold confidence level for a classification assessment FIG. 3 is a flowchart illustrating an example method 300 for partitioning digital documents, such as digital real estate documents, in accordance with one embodiment of the systems and methods described herein. Method 300 may be utilized by various embodiments prior to classification of a digital document or prior to training a documentation classification filter with a digital document. More with respect for training a document classification filter is discussed later with FIG. 4, which provides a flowchart illustrating an example method for training a digital document classification filter in accordance with one embodiment of the systems and methods described herein.

Continuing with FIG. 3, method 300 begins at operation 303 in which a digital document is received for processing. Depending on the embodiment, the received digital document may be in one of a variety computer file formats, including an image file (e.g., BMP, JPEG, TIFF), a PDF file, or a Microsoft® Word document file. In some embodiments, where the digital document is an image file and the image file has yet to be processed by OCR software, such OCR processing could take place before method 300 proceeds to subsequent operations.

Method 300 then continues with operation 306, which partitions (i.e., segments) the received digital document into a set of token patterns. As discussed herein, a token may comprise, for example, any word, symbol, character or character string, expression or phrase that is contained within a digital document.

In some embodiments, method 300 continues by normalizing the digital document, thereby optimizing the digital document's ability to be classified or be used in training (of document classification filters). In the illustrated embodiment, method 300 normalizes the digital document in operations 309 through 315. Specifically, at operation 309, method 300 replaces certain token patterns within the set of token patterns set with token markers. For example, a number within the set of token patterns may be replaced with a token marker "##NUMBER##," a date within the set of token patterns may be replaced with a token marker "##DATE##," a city within the set of token patterns may be replaced with a token marker "##CITY##," and a state within the set of token patterns may be replaced with a token marker "##STATE##."

At operation 312 in the illustrated example, method 300 merges certain token patterns within the set of token patterns with a single token pattern. For example, a token pattern "THERE IS" can be replaced with "THEREIS." At operation 315, method 300 removes or ignores certain token patterns within the set of token patterns when a digital document is being classified or used for training of a document classification filter. For example, depending on the embodiment, the token patterns removed or ignored may be patterns such as a conjunction, a linking verb, a preposition, or an article. For example, an embodiment may remove or ignore the words "the" and "and" within a set of token patterns.

Once method 300 has normalized the set of token patterns, operation 318 outputs or stores the resulting set of token patterns for subsequent processing. For example, after operation 318, embodiments may use the normalized set of token patterns to classify a digital document or to train a document classification filter using the digital document.

Figure 4:
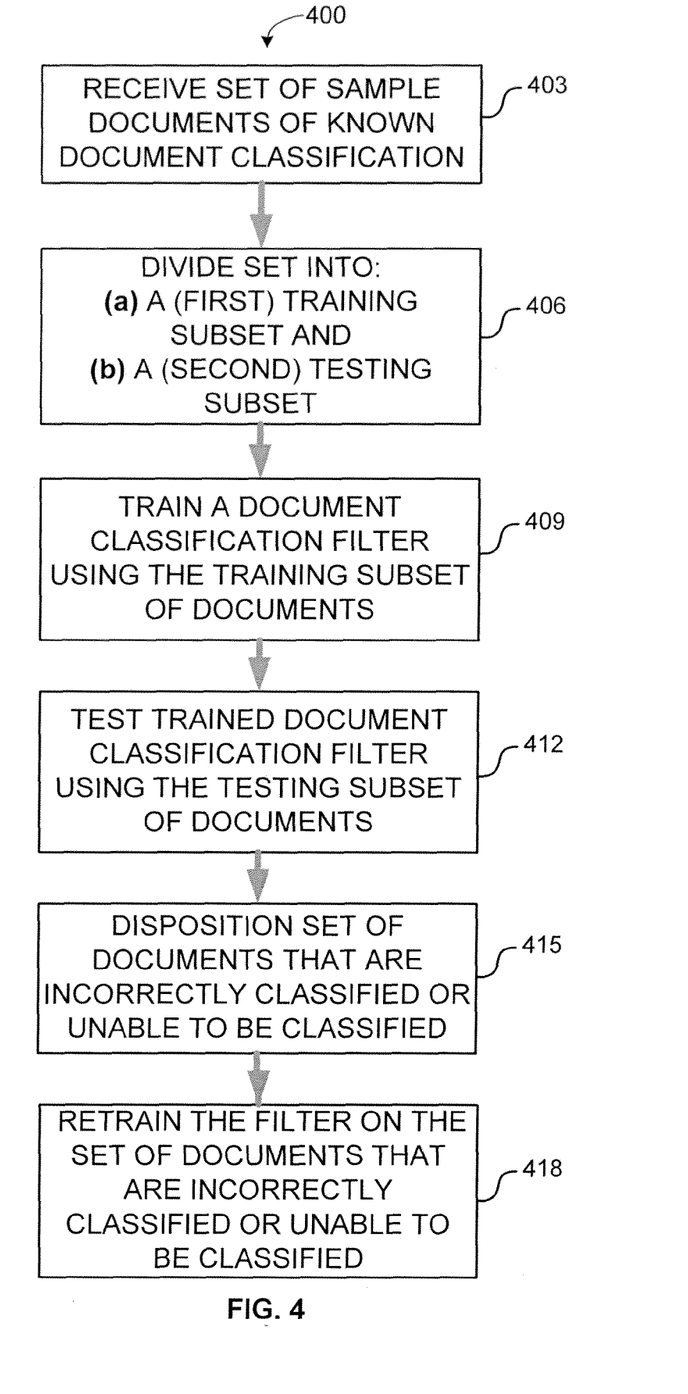
FIG. 4 is a flowchart illustrating an example method for training a digital document classification filter in accordance with one embodiment of the systems and methods described herein.

FIG. 4 is a flowchart illustrating an example method 400 for training a digital document classification filter in accordance with one embodiment of the systems and methods described herein. An embodiment may use method 400, for example, to train each of its document classification filters before the filters are used to classify an unclassified digital documents. Method 400 begins at operation 403 when a set of digital documents of a known document classification are received for training a document classification filter. For example, method 400 may receive a set of sample deeds of trusts to train a "deed of trust" document classification filter on what token patterns a deed of trust should contain. In another example, method 400 may receive a set of sample assign of rights to train a mechanics lien document classification filter on what token patterns a mechanics lien should not contain. As discussed herein, depending on the embodiment and the source of the digital document, the digital document received may be in one of a variety computer file formats, including an image file, a PDF file, or a Microsoft® Word document file. In some embodiments, where the digital document is an image file and the image file has yet to be processed by OCR software, such OCR processing could take place before method 400 proceeds to subsequent operations.

At operation 406, the example method 400 continues by dividing the set of sample digital documents into a first subset for training a document classification filter, and into a second subset for testing the document classification filter. Then, during operation 409, the first (training) subset of sample digital documents is used to train a document classification filter. In some embodiments, this may involve inputting the training subset into the document classification filter while concurrently informing the document classification filter whether the digital documents in the training subset match or mismatch the document classification of the filter (i.e., are a member of the filter's associated document classification). For instance, an "assignment of rights" document classification filter may be trained by inputting a set of "deed of trust" documents into the filter while concurrently informing the filter that the set of deeds of trusts documents does not belong in the "assignment of rights" document classification. During training, a filter may be created (when one does not already exist) or modified by the inputted training subset of digital documents. More with respect to training document classification filters will be discussed later with FIG. 5, which provides an example method for creating and updating a document classification filter in accordance with one embodiment of the systems and methods described herein.

Next, at operation 412, the document classification filter trained during operation 409 is tested using the second (testing) subset. Specifically, in some embodiments, as the trained filter is applied to digital documents from the test subset, when the trained filter results in a misclassification or a failure to classify, such misclassified/failed documents are saved or marked for subsequent dispositioning.

At operation 415, a user or administrator may disposition the misclassification of a test document or failure to classify of the test document by indicating its actual document classification. For example, when a "covenants and restrictions" document classification filter fails to successfully classify a test digital document known to be a "covenants and restrictions" digital document, a user may explicitly disposition that test document as a member of the "covenants and restrictions" document classification.

Once the test documents have been dispositioned, method 400 retrains the trained filter with the correct classification of those documents. For example, continuing with the previous example, the "covenants and restrictions" document classification filter may be retrained by inputting the test "covenants and restrictions" document while informing the filter that the test document does belong to the "covenants and restrictions" document classification. By dispositioning misclassified/ failed test documents and retraining the document classification filter using the dispositioned test documents, some embodiments are able to adjust and fine-tune a document classification filter's ability to classify digital documents.

It should be noted that in some embodiments, the operation of dividing the set of digital documents into a first set and a second set is entirely optional or skipped altogther; when such is the case, the entire set of digital documents is used for training the document classification filter. Further, in some embodiments, the training of a digital document classification filter may only involve a only the testing phase illustrated in operations 412-415. For example, in operation 412, one could try to classify an entire set of digital documents using a document classification filter that was previously trained or never trained (i.e., test the document classification filter against the entire set of digital documents) and, then in operation 415, disposition those digital documents that the document classification filter classifies incorrectly (e.g., correct an IS indication to an ISNOT indication, and vice-versa).

Figure 5:
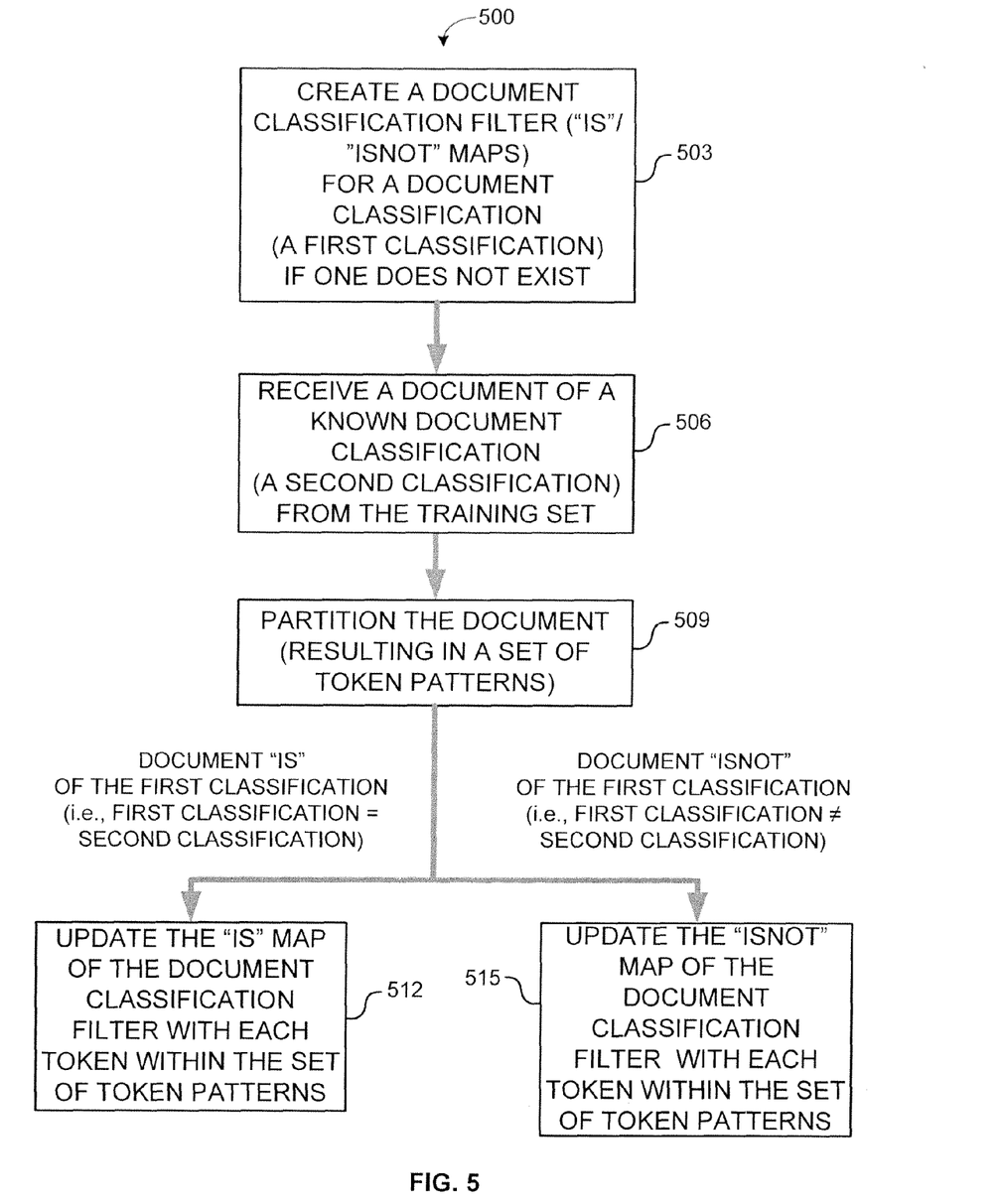
FIG. 5 is a flowchart illustrating an example method for creating and updating a document classification filter in accordance with one embodiment of the systems and methods described herein.

FIG. 5 is a flowchart illustrating an example method 500 for creating and updating a document classification filter in accordance with one embodiment of the systems and methods described herein. As described above, depending on the embodiment, the document classification filter may be applied to an unclassified digital document to either (i) make a determination of whether the unclassified digital document belongs to the filter's associated document classification (e.g., determination of whether the unclassified digital document IS is ISNOT associated with the document classification), (ii) make such a determination with a confidence level (e.g., probability that the determination is correct), or, alternatively, (iii) output a score (e.g. probability) that the unclassified digital document belongs to the filter's associated document classification. Further, the composition of a document classification filter may vary from embodiment to embodiment. For example, in the illustrated embodiment, each document classification filter may comprise multiple lists such as one list (or map) of tokens that are indicative of a digital document belonging to the filter's associated document classification filter (also referred to herein as an "IS" map), and another list (or map) of tokens that are not indicative of digital document belonging to the filter's associated document classification filter (also referred to herein as an "ISNOT" map).

The maps may contain some of the same tokens. Further, the maps may store for each token pattern a count indicating the number of documents in which the token pattern was encountered during filter training. For example, if during the training of a "deed of trust" document classification filter, the filter encounter 45 "deed of trust" documents containing the token "deed" and 10 non-"deed of trust" documents containing the token "deed," the count for token "deed" in the "IS" map would be updated by 45, the count for token "deed" in the "ISNOT" map would be updated by 10. In some embodiments, the count for each token pattern would be used to determine the weight and importance of each token pattern. For example, in embodiments where a Bayesian-based algorithm is utilized to determine a score or classification assessment with a confidence level, the counts of the token patterns could be utilized in the determination. More with respect determining a score and classification assessment with confidence level will be discussed later with FIG. 6.

Depending on the embodiment, method 500 may initially begin at operation 503 with the creation of a new document classification filter (for a given document classification) when one for that particular document classification does not already exist. For example, operation 503 may be performed when an embodiment receives a request to train for a specific document classification and the filter for that document classification does not already exist.

Once a document classification filter has been established (i.e., created) for a first document classification, at operation 506, method 500 receives from a training set of digital documents a document of a known (second) document classification. Depending on the embodiment, the known document classification may be manually inputted by a user or administrator when the training digital document is received, or a user or administrator may inform the filter in advance of submitting a set of training documents that the set being inputted is a known document classification.

After method 500 partitions the training digital document into a set of token patterns (in accordance with an embodiment of the invention) at operation 509, method 500 uses the known (second) document classification to determine which of the filter's two maps need to be updated. For example, where the known (second) document classification matches the filter's associated (first) document classification, the list of tokens indicative of the filter's associated (first) document classification (i.e., the "IS" map) is updated at operation 512 with the set of token patterns that resulted during operation 509. Conversely, where the known (second) document classification mismatches the filter's associated (first) document classification, the list of tokens not indicative of the filter's associated (first) document classification (i.e., the "ISNOT" map) is updated at operation 515 with the set of token patterns that resulted during operation 509.

In embodiments where a map stores for each token pattern a count of documents, updating the map may comprise of updating those counts based on the set of token patterns resulting during operation 509. For example, during training of a "deed of trust" document classification filter, when a training digital document is encountered containing the token "deed," the count for the token "deed" is updated in the filter's "IS" map. In some embodiments, when a map is to be updated, the embodiment may comprise of checking if a token pattern already exists in the map, adding the token pattern to the map if it doesn't already exist, and updating the token pattern's count by incrementing the count when a token pattern is encountered in a trained digital document.

Figure 6:
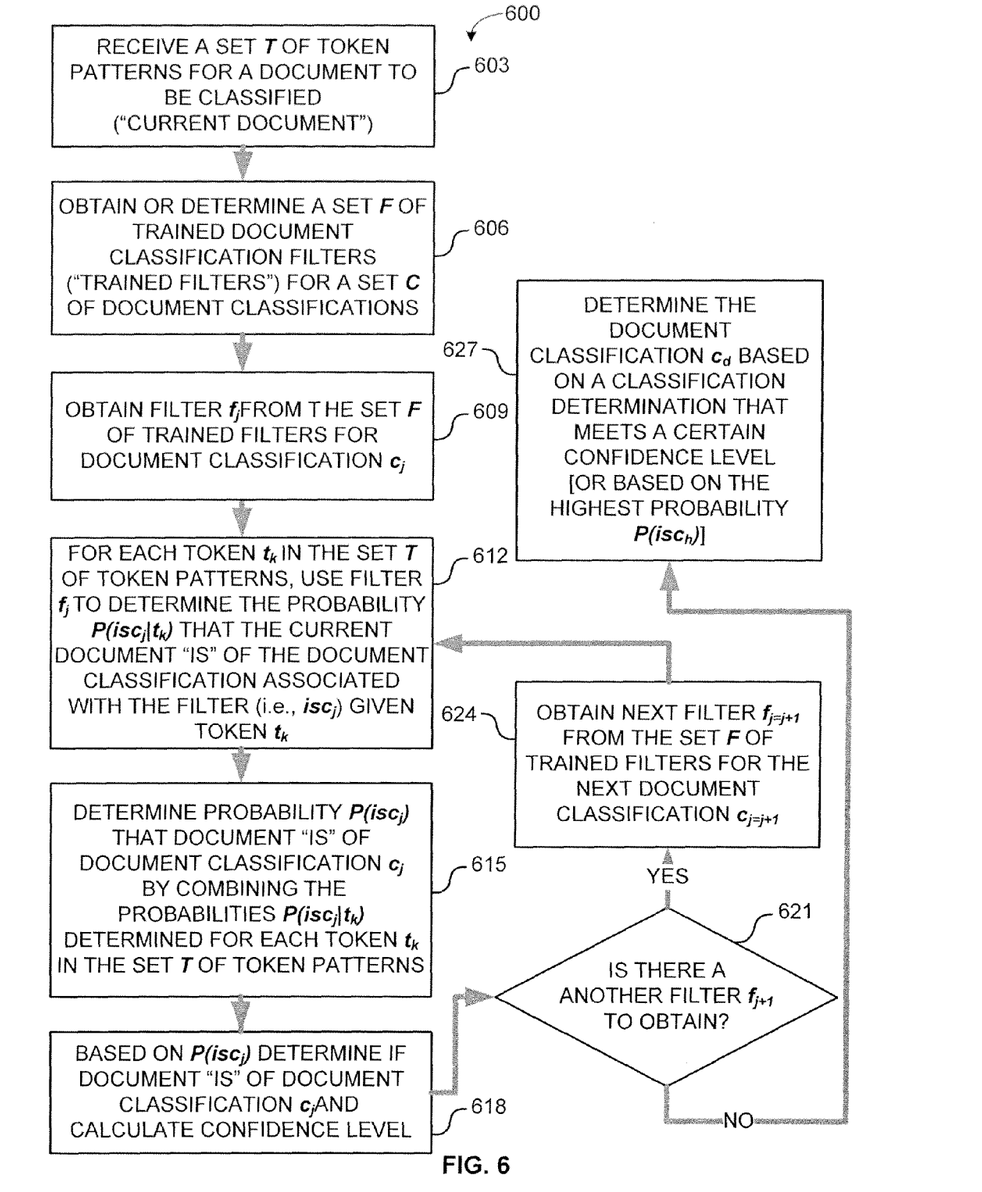
FIG. 6 is a flowchart illustrating an example method for using document classification filters to determine a document classification for a digital document in accordance with one embodiment of the systems and methods described herein.

FIG. 6 is a flowchart illustrating an example method 600 for using document classification filters to determine a document classification for a digital document in accordance with one embodiment of the systems and methods described herein. Beginning at operation 603, method 600 receives a set of token patterns T for a digital document to be classified. Depending on the embodiment, the set of token patterns may be the result of a partition processes as described herein.

At operation 606, method 600 determines a set F of trained document classification filters that will be applied to the token patterns T. Each filter $f_j$ from the set F corresponds and is associated with a document classification $c_j$ from set C of document classifications (where the j index off and of c that ties the correspondence), and each filter $f_j$ tests the digital document for membership to its associated document classification through its token patterns T. For example, a "mechanics lien" document classification filter within the set F would be associated with the "mechanics lien" document classification and test a digital document for membership to the "mechanics lien" document classification. The set F of filters may contain one or more filters and those filters may be selected in one of several different ways. For example, the set F of filters may be determined by having a user or administrator choose the filters they wish to apply to the unclassified documents being received at operation 603. Alternatively, the set F may be determined by the embodiment utilizing every document classification filter that is available to the embodiment. For example, if an embodiment is configured with thirty-two document classification filters, such an embodiment may determine that the set F of filters should include all thirty-two filters. Regardless, in some embodiments, before proceeding with application of a filter, the method may first identify any filters within the set F that have not already been trained and prompt the user or administrator to perform training for such filters or remove the filters from the set F.

Once the set F of filters has been determined, in operations 609 and 612, method 600 takes a filter $f_j$ from the set F and applies it to each token $t_k$ in the set T of token patterns to determine the probability $P(isc_j|t)$ that the current digital document is a member $isc_j$ of the document classification $c_j$ associated with the current filter $f_j$ given that the current digital document contains token $t_k$. For example, where the current filter $f_j$ is a "deed of trust" document classification filter, given that the current digital document contains the token "deed," operation 612 would calculate the probability that the current digital document is a member of the "deed of trust" document classification given the token "deed" is in the current digital document (i.e., P("IS" deed of trust|"deed")). In some embodiments the probability is determined using the following equation based on Bayes' theorem:

$$P(\text{``ISC''} | W) = \frac{P(W | \text{``ISC''}) \times P(\text{``ISC''})}{P(W | \text{``ISC''}) \times P(\text{``ISC''}) + P(W | \text{``ISNOTC''}) \times P(\text{``ISNOTC''})}$$

where, P("ISC"|W) is the probability that the current digital document is a member of the current document classification being tested for knowing that the token W is in the current digital document; P("ISC") is the overall probability that any given digital document is a member of the current document classification being tested for; P(W|"ISC") is the probability that the token W appears in a digital document that is a member of the current document classification being tested for; P("ISNOTC") is the probability that any given digital is not a member of the current document classification being tested for; and P(W|"ISNOTC") is the probability that the token W appears in a digital document that is not a member of the current document classification being tested for. In some embodiments, the data use to calculate these probabilities can be determined from the token counts maintained by the "IS" and "ISNOT" maps of the current filter $f_j$.

Following the determination of a probability $P(isc_j|t_k)$ for each token within the token patterns set T using the current filter $f_j$, operation 615 calculates the combined probability $P(isc_j)$ that the current digital document is a member $isc_j$ of the document classification $c_j$ associated with the current filter $f_j$. Specifically, operation 615 does this is by combining each of the probabilities $P(isc_j|t_k)$ calculated for each token $t_k$ in the set T of token patterns. For example, in some embodiments, the following algorithm is used to combine the probabilities:

$$P(\text{``ISC''}) = \frac{P(\text{``ISC''} | W_1) \times P(\text{``ISC''} | W_2) \ldots \times P(\text{``ISC''} | W_n)}{P(\text{``ISC''} | W_1) \times P(\text{``ISC''} | W_2) \ldots \times P(\text{``ISC''} | W_n) + (1 - P(\text{``ISC''} | W_1)) \times (1 - P(\text{``ISC''} | W_2)) \ldots \times (1 - P(\text{``ISC''} | W_n))}$$

where, P("ISC") is the probability that the current digital document is a member of the current document classification being tested for knowing that the tokens $W_1 \ldots W_n$ are in the current digital document; and $P(\text{``ISC''}|W_n)$ is the probability that the current digital document is a member of the current document classification being tested for knowing that the token $W_n$ is in the current digital document.

Other embodiments of the current invention may use alternative methods to combine the probabilities calculated during operation 612. For example, some embodiments, may break the probabilities that are in floating-point number values into normalized fractions and integrals of the power of 2. This occurs, for instance, when probability values calculated are sufficiently small enough to introduce errors into subsequent calculations.

After calculating the combined probability $P(isc_j)$ for each filter $f_j$ applied to the current document, method 600 continues with operation 618, where based on the combined probability $P(isc_j)$, method 600 determines for the current filter $f_j$ if the current document is a member $isc_j$ of the document classification $c_j$ associated with the filter $f_j$. In some embodiments, method 600 further calculates a confidence level for its classification determination. For example, in some embodiments, method 600 may utilize a Chi-square calculation ($\chi^2$ test) on the combined probability $P(isc_j)$ to calculate the goodness of fit of the probability calculated and determine the confidence level of a document class determination therefrom.

Subsequent to the determination of operation 618 for current filter $f_j$, operations 621 and 624 are performed to repeat operations 612-618 for the remaining filters $f_{j=j+1}$ in filter set F. Once operation 612-618 has peen performed for each of the remaining filters $f_{j=j+1}$, method 627 makes a final determination of what document classification the current document belongs to. For example, in embodiments where a classification determination and confidence level is produced for each filter filter $f_j$ at operation 618, operation 627 would identify which the classification determination produced the highest confidence level or which classification determinations produced a confidence level above a certain threshold, and assign the current document those document classifications. In other embodiments, where method 600 does not perform operation 618 but merely uses the combined probability $P(isc_j)$ calculated for each filter at operation 615, operation 627 could identify which filter $f_j$ produced the highest probability or which set of filters produced a probability above a certain threshold, and assign the current document the document classification associated with those identified filters.

As used herein, the term set may refer to any collection of elements, whether finite or infinite. The term subset may refer to any collection of elements, wherein the elements are taken from a parent set; a subset may be the entire parent set. The term proper subset refers to a subset containing fewer elements than the parent set. The term sequence may refer to an ordered set or subset. The terms less than, less than or equal to, greater than, and greater than or equal to, may be used herein to describe the relations between various objects or members of ordered sets or sequences; these terms will be understood to refer to any appropriate ordering relation applicable to the objects being ordered.

The term tool can be used to refer to any apparatus configured to perform a recited function. For example, tools can include a collection of one or more modules and can also be comprised of hardware, software or a combination thereof. Thus, for example, a tool can be a collection of one or more software modules, hardware modules, software/hardware modules or any combination or permutation thereof. As another example, a tool can be a computing device or other appliance on which software runs or in which hardware is implemented.

Figure 7:
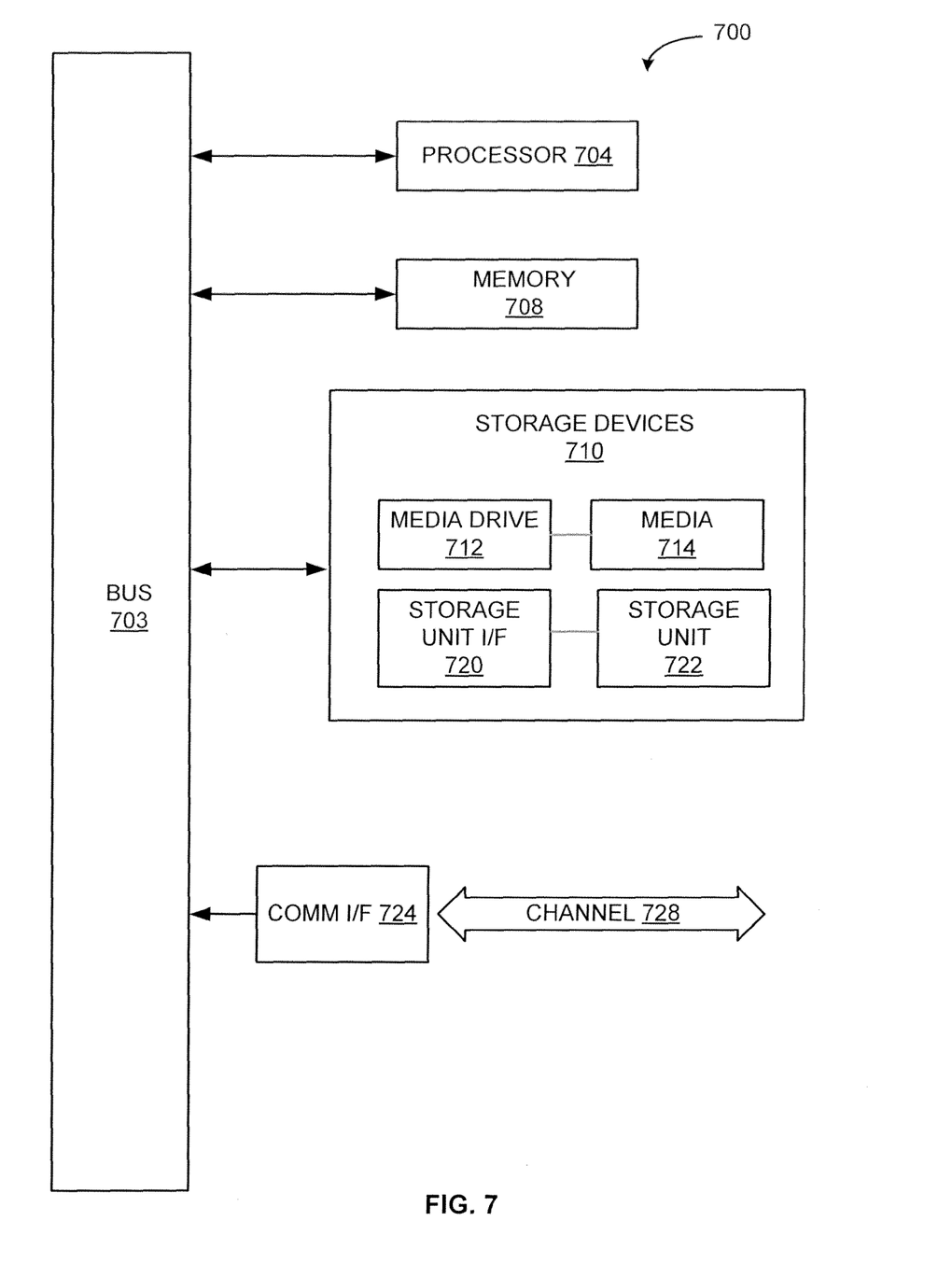
FIG. 7 illustrates an example computing module for implementing various embodiments of the systems and methods described herein.

As used herein, the term module might describe a given unit of functionality that can be performed in accordance with one or more embodiments of the present invention. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the invention are implemented in whole or in part using software, in one embodiment, these software elements can be implemented to operate with a computing or processing module capable of carrying out the functionality described with respect thereto. One such example computing module is shown in FIG. 7. Various embodiments are described in terms of this example-computing module 700. After reading this description, it will become apparent to a person skilled in the relevant art how to implement the invention using other computing modules or architectures.

Referring now to FIG. 7, computing module 700 may represent, for example, computing or processing capabilities found within desktop, laptop and notebook computers; handheld computing devices (PDA's, smart phones, cell phones, palmtops, etc.); mainframes, supercomputers, workstations or servers; or any other type of special-purpose or general-purpose computing devices as may be desirable or appropriate for a given application or environment. Computing module 700 might also represent computing capabilities embedded within or otherwise available to a given device. For example, a computing module might be found in other electronic devices such as, for example, digital cameras, navigation systems, cellular telephones, portable computing devices, modems, routers, WAPs, terminals and other electronic devices that might include some form of processing capability.

Computing module 700 might include, for example, one or more processors, controllers, control modules, or other processing devices, such as a processor 704. Processor 704 might be implemented using a general-purpose or special-purpose processing engine such as, for example, a microprocessor, controller, or other control logic. In the illustrated example, processor 704 is connected to a bus 702, although any communication medium can be used to facilitate interaction with other components of computing module 700 or to communicate externally.

Computing module 700 might also include one or more memory modules, simply referred to herein as main memory 708. For example, preferably random access memory (RAM) or other dynamic memory, might be used for storing information and instructions to be executed by processor 704. Main memory 708 might also be used for storing temporary variables or other intermediate information during execution of instructions to be executed by processor 704. Computing module 700 might likewise include a read only memory ("ROM") or other static storage device coupled to bus 702 for storing static information and instructions for processor 704.

The computing module 700 might also include one or more various forms of information storage mechanism 710, which might include, for example, a media drive 712 and a storage unit interface 720. The media drive 712 might include a drive or other mechanism to support fixed or removable storage media 714. For example, a hard disk drive, a floppy disk drive, a magnetic tape drive, an optical disk drive, a CD or DVD drive (R or RW), or other removable or fixed media drive might be provided. Accordingly, storage media 714 might include, for example, a hard disk, a floppy disk, magnetic tape, cartridge, optical disk, a CD or DVD, or other fixed or removable medium that is read by, written to or accessed by media drive 712. As these examples illustrate, the storage media 714 can include a computer usable storage medium having stored therein computer software or data.

In alternative embodiments, information storage mechanism 710 might include other similar instrumentalities for allowing computer programs or other instructions or data to be loaded into computing module 700. Such instrumentalities might include, for example, a fixed or removable storage unit 722 and an interface 720. Examples of such storage units 722 and interfaces 720 can include a program cartridge and cartridge interface, a removable memory (for example, a flash memory or other removable memory module) and memory slot, a PCMCIA slot and card, and other fixed or removable storage units 722 and interfaces 720 that allow software and data to be transferred from the storage unit 722 to computing module 700.

Computing module 700 might also include a communications interface 724. Communications interface 724 might be used to allow software and data to be transferred between computing module 700 and external devices. Examples of communications interface 724 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 724 might typically be carried on signals, which can be electronic, electromagnetic (which includes optical) or other signals capable of being exchanged by a given communications interface 724. These signals might be provided to communications interface 724 via a channel 728. This channel 728 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to media such as, for example, memory 708, storage unit 720, media 714, and channel 728. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 700 to perform features or functions of the present invention as discussed herein.

While various embodiments of the present invention have been described above, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present invention. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A non-transitory computer readable medium having computer executable program code embodied thereon, the computer executable program code configured to cause a computing device to perform the operations of:

partitioning a digital real estate document into a set of token patterns;

normalizing the set of token patterns to obtain a normalized set of token patterns;

applying a first filter to the normalized set of token patterns to obtain a first score for the digital real estate document, wherein the first score indicates a first likelihood that the digital real estate document is a member of a first document classification associated with the first filter;

applying a second filter to the normalized set of token patterns to obtain a second score for the digital real estate document, wherein the second score indicates a second likelihood that the digital real estate document is a member of a second document classification associated with the second filter; and determining a document classification of the digital real estate document based on a set of scores associated with the digital real estate document, wherein the set of scores includes the first score and the second score;

wherein the first filter comprises a set of indicative token patterns and a set of non-indicative token patterns, wherein the indicative token patterns are those associated with the first document classification, wherein the non-indicative token patterns are those not associated with the first document classification, and wherein applying the first filter to the normalized set of token patterns to obtain the first score comprises determining the first score based on the set of indicative token patterns, the set of non-indicative token patterns, and the normalized set of token patterns.

2. The computer readable medium of claim 1, wherein determining the first score comprises using a Bayesian-based classification algorithm to determine a probability that the digital real estate document is of the first document classification, wherein the probability is the first score and the probability is calculated using the set of indicative token patterns, the set of non-indicative token patterns, and the normalized set of token patterns.

3. The computer readable medium of claim 1, wherein determining the document classification of the digital real estate document based on the set of scores associated with the digital real estate document comprises:
identifying a high score within the set of scores; and
determining that the document classification of the digital real estate document is the high score's associated document classification.

4. The computer readable medium of claim 1, wherein determining the document classification of the digital real estate document based on the set of scores associated with the digital real estate document comprises determining that the document classification of the digital real estate document is more than one document classification.

5. The computer readable medium of claim 1, wherein the operation of normalizing comprises:
locating a candidate token pattern within the set of token patterns; and
replacing the candidate token pattern with a normalized token marker.

6. The computer readable medium of claim 1, wherein the operation of normalizing comprises locating and removing a candidate token pattern within the set of token patterns, wherein the candidate token pattern is a commonly occurring word.

7. The computer readable medium of claim 1, wherein the operation of normalizing comprises:
locating at least two candidate token patterns within the set of token patterns; and
merging the candidate token patterns into a merged token pattern.

8. The computer readable medium of claim 1, the program instructions further configured to cause a computer system to perform the operations of training a filter from a plurality of document classification filters.

9. The computer readable medium of claim 8, wherein the operation of training a filter comprises:
receiving a sample digital real estate document of a known document classification;
partitioning the sample digital real estate document into a second set of token patterns;
informing the trained filter whether the known document classification matches the filter's associated document classification, thereby resulting in match information; and
updating the trained filter with the second set of token patterns and the match information.

10. The computer readable medium of claim 9, wherein the sample digital real estate document is from a set of sample digital real estate documents submitted to the trained filter for training.

11. The computer readable medium of claim 9, wherein the trained filter comprises a set of indicative token patterns and a set of non-indicative token patterns, wherein the trained filter's indicative token patterns are those associated with the trained filter's associated document classification, wherein the trained filter's non-indicative token patterns are those not associated with the trained filter's associated document classification, and wherein updating the trained filter comprises:
updating the trained filter's set of indicative token patterns when the match information indicates that the known document classification matches the trained filter's associated document classification; and
updating the trained filter's set of non-indicative token patterns when the match information indicates that the known document classification does not match the trained filter's associated document classification.

12. The computer readable medium of claim 1, wherein the non-indicative token patterns are tokens that are not indicative of a digital document belonging to the first filter's associated first document classification.

13. A non-transitory computer readable medium having computer executable program code embodied thereon, the computer executable program code configured to cause a computing device to perform the operations of:
partitioning a digital real estate document into a set of token patterns;
normalizing the set of token patterns to obtain a normalized set of token patterns;
applying a first filter to the normalized set of token patterns to obtain a first indicator of whether the digital real estate document is a member of a first document classification and a first confidence score for the first indicator;
applying a second filter to the normalized set of token patterns to obtain a second indicator of whether the digital real estate document is a member of a second document classification and a second confidence score for the second indicator; and
determining a document classification of the digital real estate document from a set of indicators associated with the digital real estate document and set of confidence scores associated with the set of indicators, wherein the set of indicators includes the first and second indicators and the set of confidence scores includes the first and second confidence scores;
wherein the first filter comprises a set of indicative token patterns and a set of non-indicative token patterns, wherein the indicative token patterns are those associated with the first document classification, wherein the non-indicative token patterns are those not associated with the first document classification; and
wherein applying the first filter to the normalized set of token patterns to obtain the first indicator and the first confidence score comprises:
performing a determination of whether the digital real estate document is a member of the first document classification based on the set of indicative token patterns, the set of non-indicative token patterns, and the normalized set of token patterns;
setting the first indicator according to the determination; and
calculating the first confidence score based on a level of confidence in the determination.

14. The computer readable medium of claim 13, wherein performing the determination of whether the digital real estate document is a member of the first document classification comprises using a Bayesian-based classification algorithm to perform the determination using the set of indicative token patterns, the set of non-indicative token patterns, and the normalized set of token patterns and to generate the first confidence score associated with the determination.

15. The computer readable medium of claim 13, wherein determining the document classification of the digital real estate document based on the set of indicators and the set of confidence scores comprises:
   identifying an indicator in the set of indicators that signifies that the digital real estate document is a member of the indicator's associated document classification; and
   using the confidence score in the set of confidence scores associated with the indicator to determine whether the document classification of the digital real estate document is the indicator's associated document classification.

16. The computer readable medium of claim 13, wherein the confidence score must meet a confidence threshold for the document classification of the digital real estate document to be the indicator's associated document classification.

17. The computer readable medium of claim 13, wherein determining the document classification of the digital real estate document based on the set of indicators and confidence scores associated with the digital real estate document comprises determining that the document classification of the digital real estate document is more than one document classification.

18. The computer readable medium of claim 13, wherein the operation of normalizing comprises:
   locating a candidate token pattern within the set of token patterns; and
   replacing the candidate token pattern with a normalized token marker.

19. The computer readable medium of claim 13, wherein the operation of normalizing comprises locating and removing a candidate token pattern within the set of token patterns, wherein the candidate token pattern is a commonly occurring word.

20. The computer readable medium of claim 13, wherein the operation of normalizing comprises:
   locating at least two candidate token patterns within the set of token patterns; and
   merging the candidate token patterns into a merged token pattern.

21. The computer readable medium of claim 13, the program instructions further configured to cause a computer system to perform the operations of training a filter from a plurality of document classification filters.

22. The computer readable medium of claim 21, wherein the operation of training the filter comprises:
   receiving a sample digital real estate document of a known document classification;
   partitioning the sample digital real estate document into a second set of token patterns;
   informing the trained filter whether the known document classification matches the trained filter's associated document classification, thereby resulting in match information; and
   updating the trained filter with the second set of token patterns and the match information.

23. The computer readable medium of claim 22, wherein the sample digital real estate document is from a set of sample digital real estate documents submitted to the trained filter for training.

24. The computer readable medium of claim 22, wherein the trained filter comprises a set of indicative token patterns and a set of non-indicative token patterns, wherein the trained filter's indicative token patterns are those associated with the trained filter's associated document classification, wherein the trained filter's non-indicative token patterns are those not associated with the trained filter's associated document classification, and wherein updating the trained filter comprises:
   updating the trained filter's set of indicative token patterns when the match information indicates that the known document classification matches the trained filter's associated document classification; and
   updating the trained filter's set of non-indicative token patterns when the match information indicates that the known document classification does not match the trained filter's associated document classification.

25. The computer readable medium of claim 13, wherein the non-indicative token patterns are tokens that are not indicative of a digital document belonging to the first filter's associated first document classification.

26. A computer system configured to determine a document classification for a digital real estate document, comprising:
   a processor;
   a memory connected to the processor; and
   a computer-readable medium having instructions embedded therein, instructions configured to cause the processor to perform the operations of:
      partitioning the digital real estate document into a set of token patterns;
      normalizing the set of token patterns to obtain a set of normalized set of token patterns;
      applying a first filter to the normalized set of token patterns to obtain a first score for the digital real estate document, wherein the first score indicates a first likelihood that the digital real estate document is a member of a first document classification associated with the first filter;
      applying a second filter to the normalized set of token patterns to obtain a second score for the digital real estate document, wherein the second score indicates a second likelihood that the digital real estate document is a member of a second document classification associated with the second filter; and
      determining the document classification of the digital real estate document based on a set of scores associated with the digital real estate document, wherein the set of scores includes the first score and the second score; and
   wherein the first filter comprises a set of indicative token patterns and a set of non-indicative token patterns, wherein the indicative token patterns are those associated with the first document classification, wherein the non-indicative token patterns are those not associated with the first document classification, and wherein applying the first filter to the normalized set of token patterns to obtain the first score comprises determining the first score based on the set of indicative token patterns, the set of non-indicative token patterns, and the normalized set of token patterns.

27. A computer system configured to determine a document classification for a digital real estate document, comprising:
   a processor;
   a memory connected to the processor; and
   a computer-readable medium having instructions embedded therein, instructions configured to cause the processor to perform the operations of:
      partitioning the digital real estate document into a set of token patterns;

normalizing the set of token patterns to obtain a set-ef normalized set of token patterns;

applying a first filter to the normalized set of token patterns to obtain a first indicator of whether the digital real estate document is a member of a first document classification and a first confidence score for the first indicator;

applying a second filter to the normalized set of token patterns to obtain a second indicator of whether the digital real estate document is a member of a second document classification and a second confidence score for the first Indicator; and determining the document classification of the digital real estate document from a set of indicators associated with the digital real estate document and set of confidence scores associated with the set of indicators, wherein the set of indicators includes the first and second indicators and the set of confidence scores includes the first and second confidence scores;

wherein the first filter comprises a set of indicative token patterns and a set of non-indicative token patterns, wherein the indicative token patterns are those associated with the first document classification, wherein the non-indicative token patterns are those not associated with the first document classification.

* * * * *